(12) United States Patent
Cesar et al.

(10) Patent No.: US 8,938,246 B2
(45) Date of Patent: Jan. 20, 2015

(54) METHOD FOR SCHEDULING TERMINALS IN A RADIO COMMUNICATION NETWORK, AND CORRESPONDING BASE STATION

(75) Inventors: Bozo Cesar, Stuttgart (DE); Mark Doll, Stuttgart (DE); Robert Fetscher, Stuttgart (DE); Hardy Halbauer, Ettlingen (DE); Oliver Stanze, Stuttgart (DE)

(73) Assignee: Alcatel Lucent, Boulogne Billancourt (FR)

( * ) Notice: Subject to any disclaimer, the term of this patent is extended or adjusted under 35 U.S.C. 154(b) by 190 days.

(21) Appl. No.: 13/256,718

(22) PCT Filed: Feb. 10, 2010

(86) PCT No.: PCT/EP2010/051632
§ 371 (c)(1),
(2), (4) Date: Sep. 15, 2011

(87) PCT Pub. No.: WO2010/105878
PCT Pub. Date: Sep. 23, 2010

(65) Prior Publication Data
US 2012/0003984 A1  Jan. 5, 2012

(30) Foreign Application Priority Data

Mar. 17, 2009 (EP) .................................. 09305245

(51) Int. Cl.
*H04W 72/00* (2009.01)
*H04W 72/12* (2009.01)
*H04W 92/20* (2009.01)

(52) U.S. Cl.
CPC ...... *H04W 72/1205* (2013.01); *H04W 72/1231* (2013.01); *H04W 92/20* (2013.01)
USPC ........... 455/450; 455/464; 455/509; 370/329; 370/341; 370/431

(58) Field of Classification Search
CPC . H04L 47/2433; H04L 12/5693; H04L 47/24; H04L 1/1854; H04W 72/1242; H04W 72/10; H04W 36/18; H04W 72/1278; H04W 28/18; H04W 52/244; H04W 72/1226; H04W 24/10; H04W 72/1205
USPC ........... 455/450, 464, 509; 370/329, 341, 431
See application file for complete search history.

(56) References Cited

U.S. PATENT DOCUMENTS

2003/0227889 A1* 12/2003 Wu et al. ................... 370/335
2004/0171407 A1*  9/2004 Ninomiya ................. 455/561

(Continued)

FOREIGN PATENT DOCUMENTS

CN   101043638 A   9/2007
WO   WO 2008/135101 A   11/2008

OTHER PUBLICATIONS

Siemens, "Functional Entity RRM/RRC," 3$^{rd}$ Generation Partnership Project (3GPP), 3GPP Joint Meeting: RAN2 & RAN3, R2-052907, vol. RAN WG2, XP050130131, 8 pages, Seoul, Korea, Nov. 7-11, 2005.

(Continued)

*Primary Examiner* — Liton Miah
(74) *Attorney, Agent, or Firm* — Fay Sharpe LLP

(57) ABSTRACT

The present invention relates to a method for scheduling transmissions in a radio communication system comprising a plurality of base stations and a plurality of terminals, a base station being associated to a sector and transmitting/receiving data to/from terminals located in said sector. According to the present invention, the method comprises the steps of: —determining an area around each given sector, said area comprising a set of sectors, —allocating to said sectors in said area a scheduling priority chosen among at least two different scheduling priorities, —scheduling decisions in a sector having a lower scheduling priority than a sector belonging to said area depending on scheduling decisions made for said sector with higher scheduling priority, said scheduling decisions made in said sector with higher scheduling priority being reported by said base station associated to said sector with higher scheduling priority to said base station associated to said sector with lower scheduling priority.

8 Claims, 5 Drawing Sheets

(56) References Cited

U.S. PATENT DOCUMENTS

| | | | |
|---|---|---|---|
| 2004/0190482 A1* | 9/2004 | Baum et al. | 370/347 |
| 2008/0233967 A1 | 9/2008 | Montojo et al. | |
| 2008/0274760 A1* | 11/2008 | Senarath et al. | 455/512 |
| 2009/0233544 A1* | 9/2009 | Oyman et al. | 455/7 |
| 2010/0220682 A1* | 9/2010 | Tao et al. | 370/330 |

OTHER PUBLICATIONS

Texas Instruments, "Inter-Cell Interference Mitigation for EUTRA," $3^{rd}$ Generation Partnership Project (3GPP), 3GPP TSG RAN WG1, R1-051059, vol. RAN WG1, XP050100676, 7 pages, San Diego, USA, Oct. 10-Oct. 14, 2005.

English Bibliography for Chinese Patent Application Publication No. CN101043638 A, published Sep. 26, 2007, printed from Thomson Innovation on Jul. 10, 2014.

Lucent, "FDD MIMO System Simulation Assumptions," $3^{rd}$ Generation Partnership Project (3GPP), 3GPP TSG-RAN WG1 Meeting #37, R1-040477, pp. 1-11, Montreal, Canada, May 10-14, 2004.

* cited by examiner

METHOD FOR SCHEDULING TERMINALS IN A RADIO COMMUNICATION NETWORK, AND CORRESPONDING BASE STATION

BACKGROUND OF THE INVENTION

The present invention relates to a method far scheduling terminals in a radio communication network.

Common scheduling in radio communication networks consists is defining distinct resources which may be for example separated in frequency, time or code and allocated to terminal knowing that two terminals in a predefined area will not be allocated the same resource in order to avoid interference.

In recent radio communication network, and especially in order to increase their throughput and efficiency, methods have been proposed which enables it to schedule more than one terminal in a predefined area on a single resource at the same time. The main issue consists in selecting appropriately the terminals to which identical resources can be allocated in order to limit the mutual interference caused in the system by the terminals using the same resources simultaneously. Especially in multi-cellular deployments with frequency reuse 1, strong interference is experienced at the cell borders. This interference can be reduced by coordinating the transmission in sectors which are close to each other. Criteria for selecting terminals which can be scheduled on the same resources take for example into account the position of the terminals in the cell and the possibility to generate separate beams using beamforming algorithms of multiple antennas base stations. More generally, only transmissions from/to terminals that result in a low mutual interference are scheduled on the same resource in neighboring sectors.

Scheduling algorithms with centralized coordination exists but have the disadvantage to require a high amount of signaling between the central entity and the base stations which need to be coordinated. Especially the whole channel conditions between the terminals and the base stations need to be forwarded to the central entity, the whole BS scheduling requests need to be forwarded to the central entity. Moreover the scheduling delay may be high.

A particular object of the present invention is to provide a scheduling algorithm showing to be more efficient with reduced signaling compared to the centralized option.

Another object of the invention is to provide a base station adapted to perform the scheduling method.

SUMMARY OF THE INVENTION

These objects, and others that appear below, are achieved by method for scheduling transmissions in a radio communication system according to claim 1, and a base station according to claim 8.

According to the present invention, the scheduling mechanism is a localized-distributed scheduling scheme restricted to a close neighborhood of the base stations. In particular, the scheduling mechanism use prioritization between base stations localized in a predefined area, the scheduling being started by the base station having the highest priority in the predefined area, the scheduling being then continued by the base stations having a second highest priority taking into account the scheduling performed by the base stations with higher priority and so on.

In a preferred embodiment, cyclically permuting of the assigned scheduling priorities among the base stations in a predefined area is then used to restore fairness among all base stations in this area.

This presents the advantage of reducing the huge signaling overhead required by a centralized scheduling mechanism to establish a common data base comprising all channel specific information system wide, and keeping that common data base consistent and up to date.

According to another aspect of the present invention, scheduling is based on intra- and inter-sector base station/terminal channel specific information (e.g. CQI, SINR, uplink/downlink pathloss, Precoding Matrix Index (PMI) for best and worst transmission conditions, . . . ) and the exchange of such channel specific information between neighboring base stations. These channel specific information allow base stations to detect terminals with high mutual interference potential and schedule such terminals on different resources to avoid high interference impact to their transmissions.

This presents the advantage of distributing relevant information for scheduling purpose only to the base stations which require them. This contributes also to keep the signaling load small enough for good performance in the radio communication system.

Another advantage of this algorithm in contrast to a centralized mechanism is that there is no conflict at coordination boundaries, because the coordination boundaries are overlapping according to the present invention.

Further advantageous features of the invention are defined in the dependent claims.

BRIEF DESCRIPTION OF THE DRAWINGS

Other characteristics and advantages of the invention will appear on reading the following description of a preferred embodiment given by way of non-limiting illustrations, and from the accompanying drawings, in which.

DETAILED DESCRIPTION OF THE INVENTION

It will be understood by those skilled in the art that the scheduling method according to this invention as well as the corresponding base station can be applied to different radio systems especially systems those following WiMAX standards or 3G LTE (3G Long Term Evolution) standards.

Figure 1:
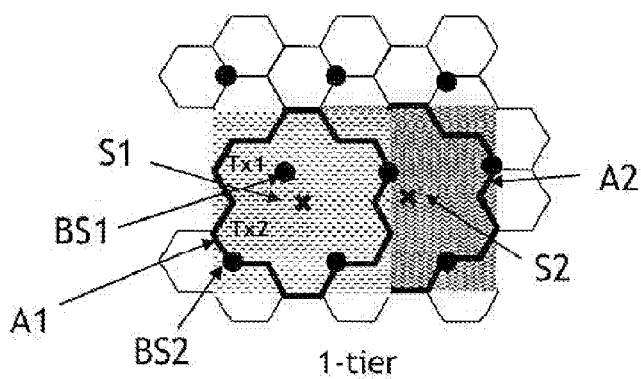
FIG. 1 shows the predetermined area around each base station as used for the localized distributed scheduling mechanism.

FIG. 1 shows the predetermined area around each base station as used for a localized distributed scheduling mechanism according to the present invention. FIG. 1 shows base stations BS serving 120° sectors in this embodiment, 3 120°-sector base stations are collocated. For each sector, on area is determined according to the present invention for the sake of implementing the localized distributed scheduling algorithm. For example, areas A1 resp A2 correspond to the set of sectors directly surrounding the sector S1 resp S2. In this example, an area comprises 6 sectors in addition to the considered sector. Depending on the sector considered a different area is to be taken into accounts.

A hexagon structure for the sectors is assumed showed in this example but the invention is not limited to such a structure.

It will be clear to the person skilled in the art that a method according to the present invention can be applied in radio communication networks with a sector's geometry different than the one presented in FIG. 1. It is especially possible to have a different number of sectors around each base station or to have different types of sector geometry around a base station.

In the following, it will be further explained how to schedule terminals located in an area using a localized distributed scheduling mechanism according to the present invention.

Two different terminals in neighbor sectors Tx1 in sector 1 of BS1 and Ty2 in sector 2 of BS2 interfere because e.g. they are located at the same sector border, so that data which is transmitted by BS1 to Tx1 disturbs Ty2 when receiving data from BS2 on the same frame resource, e.g. same slots (same time and same frequency location).

The interference can be minimized when BS2 transmits data to another Tz2 which is located far away from Tx1 while BS1 transmits data to Tx1 and both BSs use beam-forming to direct their data beams to the desired destination only. Then both BSs can use the same frame resources at the same time and they produce no or at least limited interference only.

Figure 2A:
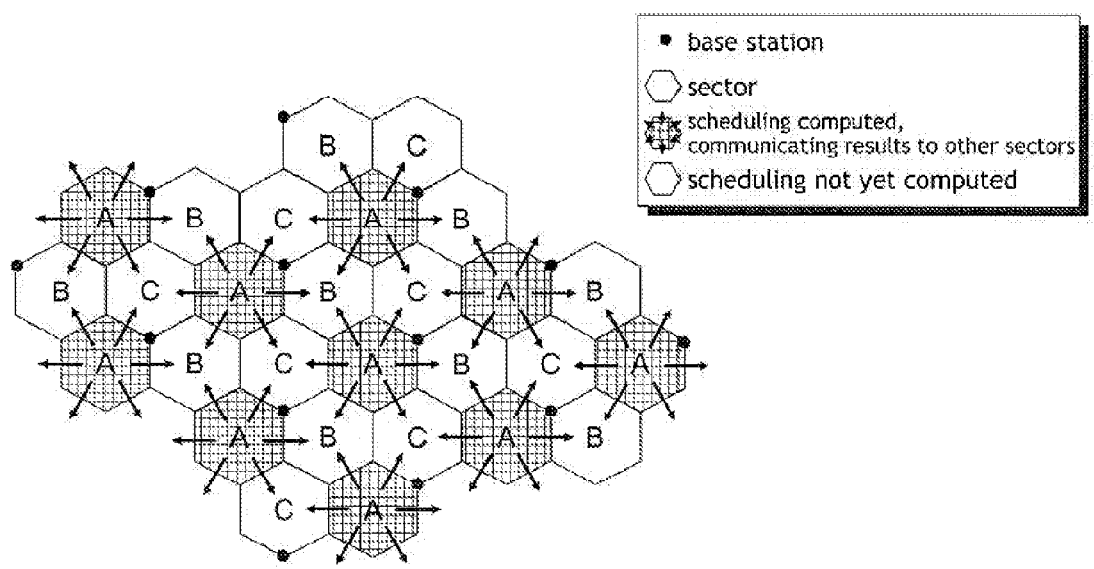
FIG. 2a-2c shows an implementation of a scheduling algorithm according to the present invention.
Figure 2B:
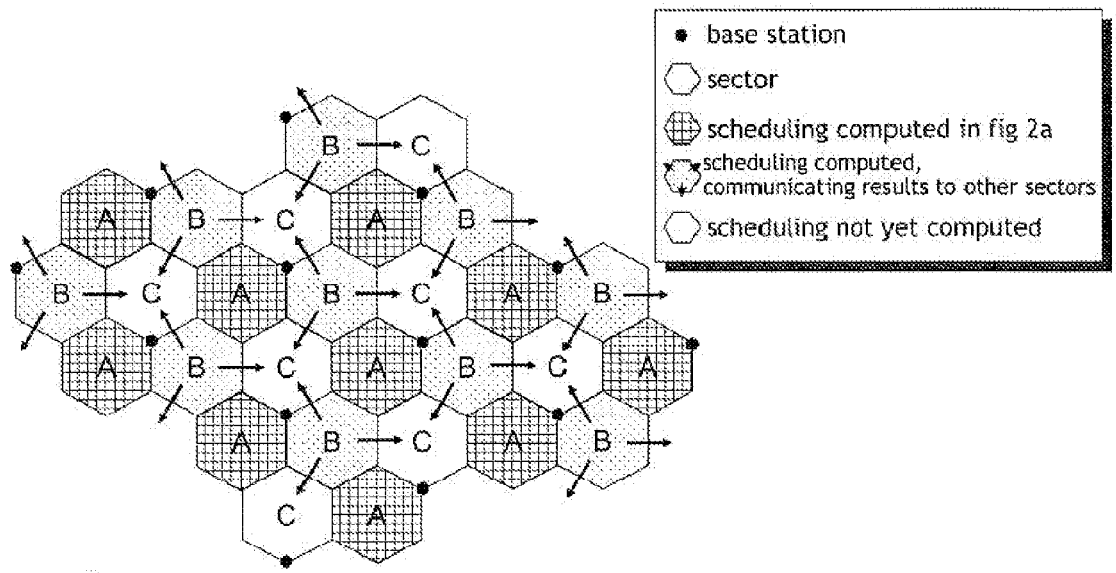
Figure 2C:
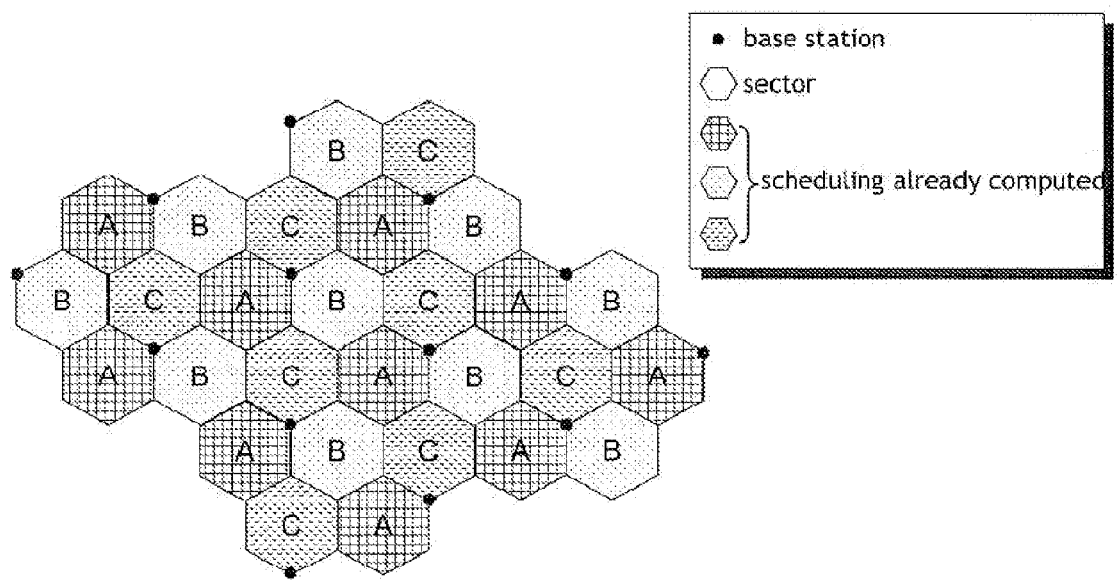

FIG. 2a-2c shows an implementation of a scheduling algorithm according to the present invention.

Contrary to prior art solutions, no central scheduler is used to coordinate the scheduling between neighbor sectors. Each sector/base station coordinates scheduling with its neighbor sectors/base stations only.

According to the present invention, a hierarchical scheduling method using prioritization is used, where the highest priority scheduler (scheduling priority A) schedules first terminals under its coverage on available resources and afterwards the other schedulers (scheduling priority B or C) schedule in the order of decreasing scheduling priority (B before C) terminals under their coverage on resources taking into account the results of all higher priority schedulers (B taking into account A; C taking into account A and B).

On the one hand, the base stations with scheduling priority B resp C decide to schedule on different resources than the one already scheduled by base stations with scheduling priority A, resp A and B in case the scheduling on the same resource would cause interference above a predefined threshold.

On the other hand, the base stations with scheduling priority B resp C can decide to schedule on identical resources than the one already scheduled by base stations with scheduling priority A, resp A and B in case the scheduling on the same resource would cause interference below a predefined threshold.

As an example, in the following it is assumed, that each sector needs one frame to schedule its frame and to transfer its frame layout to all neighbors, i.e. the scheduling type of each sector varies from frame to frame. The mechanism also works if the communication and calculation takes longer than one frame or if the complete scheduling calculations (all scheduling priorities) and communications can be performed in a single frame.

It will be understood by those skilled in the art that the method according to the invention works with more or less than 3 scheduling priorities. The 3 scheduling priorities are not to be seen as a limiting factor of the invention.

As shown in FIG. 2a, coordinated scheduling starts with some sectors of scheduling priority A which do not interfere with each other, e.g. because they are no direct neighbors. These sectors are either chosen due to their distance to each other which guarantees a low mutual interference, alternatively sectors which do not interfere for other reasons than the distance between each other can be of scheduling priority A at the same time.

Sectors of scheduling priority A generate a frame layout for a frame N or part of frame N in the near future.

Then the sectors of scheduling priority A transmit the frame layout N to all neighbor sectors of scheduling priority B and of scheduling priority C.

As shown in FIG. 2b, the sectors of scheduling priority B, which are again no direct neighbors to each other, generate a frame layout for frame N or part of frame N by placing their bursts in a way that they do not interfere with the bursts in the frame layouts N of sectors of scheduling priority A.

Finally, each sector with scheduling priority B transmits us frame/part of frame layout N to neighbor sectors of type C.

As shown in FIG. 2c, sectors of scheduling priority C finally generate a frame layout for frame/part of frame N by placing their bursts in a way that they do not interfere with the bursts in the frame/part of frame layouts N of sectors of scheduling priority A and B.

When the frame or part of frame N has to be transmitted on air, each sector fills its frame N according to its pre-calculated layout N with data that has to be transmitted at that moment.

In this embodiment, it is assumed that frame numbers are synchronized between all sectors. Optionally, it is also sufficient that each sector knows the frame offset to each of its neighbor sectors.

Figure 3:
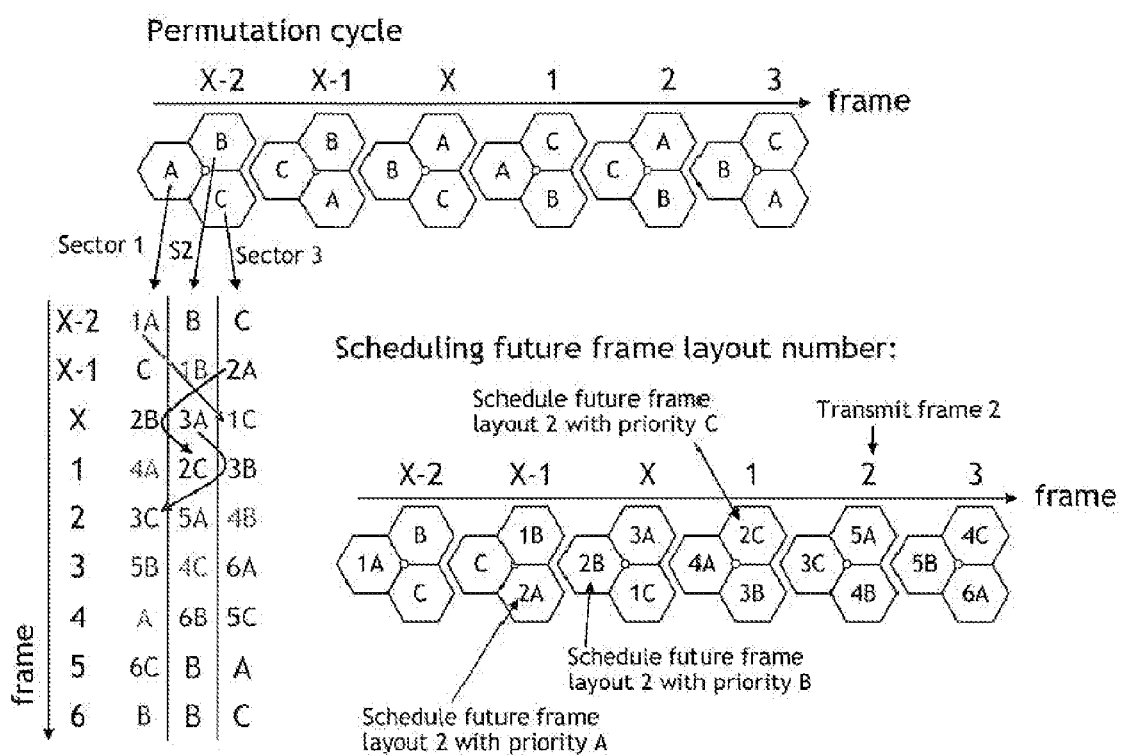
FIG. 3 shows a permutation of priorities between base stations belonging to a predetermined area according to the present invention.

FIG. 3 shows a permutation of scheduling priorities between base stations belonging to a predetermined area according to the present invention.

To assure fairness among the sectors, each sector is equally often assigned each of the scheduling priority (A, B, C) in recurring cycles.

Every sector obtains a variable scheduling priority A, B or C which is permuting from frame to frame, i.e. depending on the current frame number and the fixed frame generation ID, the sector is assigned in every frame a scheduling priority A, B or C. For example, as shown in FIG. 3 a sector can be assigned to scheduling priority A in frame X-2 and 1, scheduling priority C in frame X-1 and 2, scheduling priority B in frame X and 3, . . . .

Frame 1 is computed during the transmission of frame X-2 in sector with scheduling priority A, during the transmission of frame X-1 in sector with scheduling priority B and during the transmission of frame X in sector with scheduling priority C. Finally frame 1 is transmitted simultaneously by sectors scheduling priority A, B and C. This mechanism is used for the computation and transmission of all subsequent frames 2, 3 . . . .

The scheduling is performed sequentially by base stations with increasing scheduling priority, scheduling at a base station with lower scheduling priority taking place upon reception of scheduling decisions by base stations with higher scheduling priority.

Especially the scheduling decisions may be done during consecutive frames or during consecutive part of frames if there is the possibility to send the scheduling decision during the course of a single frame to the other base stations. Especially if signalling messages can be sent independently of data messages, the whole scheduling can be done for the next frame to send and not need 3-frame time delay as described in FIG. 3 for sake of simplicity.

It will be understood by those skilled in the art that the permutation of priority may also happen at a sub frame level if a subframe structure is defined in the corresponding radio communication network. Alternatively, the change of priority may happen every F frames only.

Figure 4:
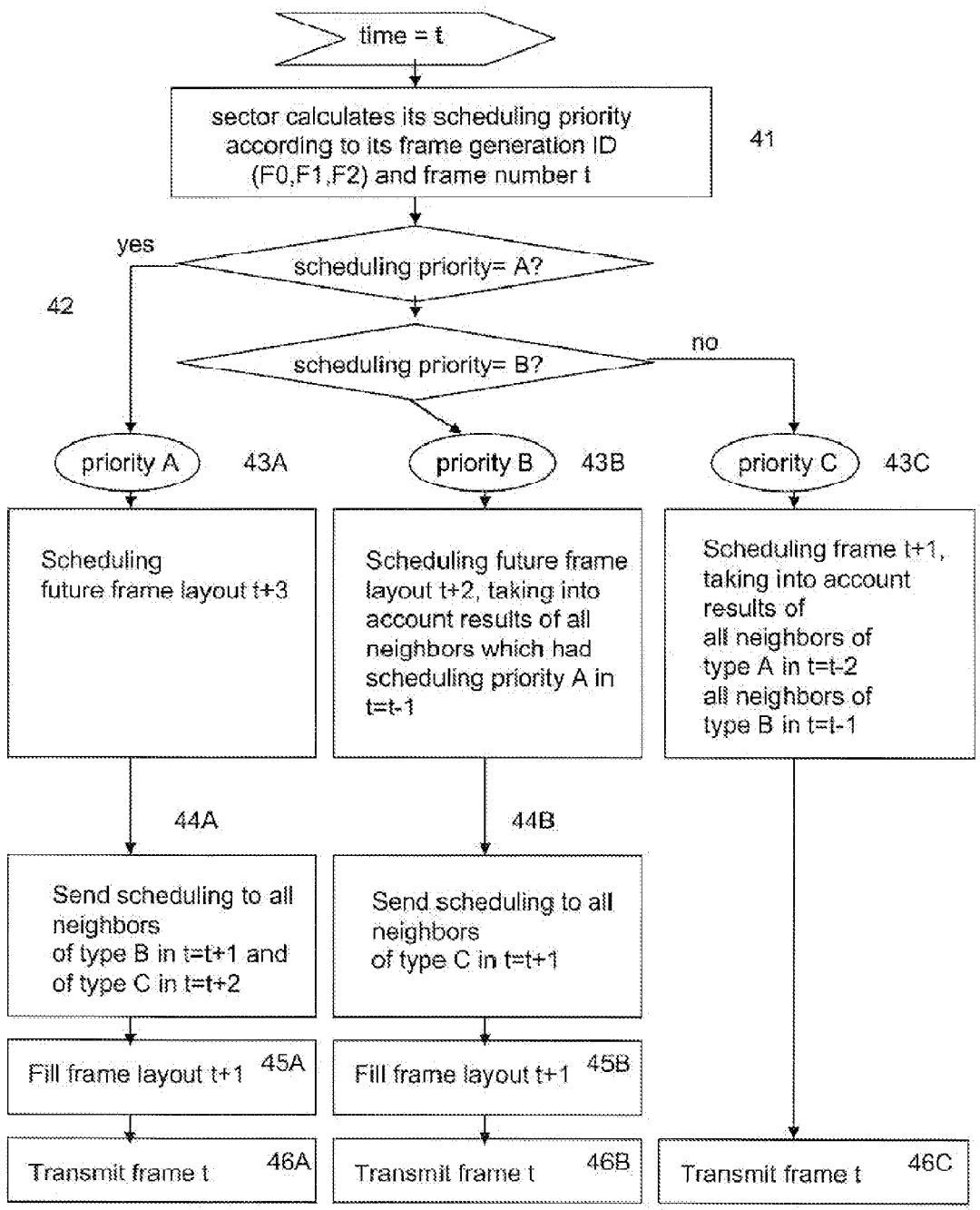
FIG. 4 shows a flow diagram of an implementation of the scheduling method according to the present invention.

FIG. 4 shows a flow diagram of an implementation of the scheduling method according to the present invention.

During initialization or by self organization methods each sector will be assigned a fixed frame generation ID.

In addition at initialization, each base station gets a list of all surrounding neighbor sectors with all their corresponding frame generation IDs.

At step 41, using the frame generation ID and the frame number every sector can determine its current scheduling priority A, B or C and it can determine for which future frame N it has to generate the frame layout N during the current frame.

At step 42, the sector applies a different scheduling depending on the calculated scheduling priority at step 41.

At step 43A, the sector with scheduling priority A computes the future frame layout N as a master since it has the highest possible scheduling priority A.

At step 43B, the sector with scheduling priority B computes the future frame layout N after considering the results of neighbor sectors with scheduling priority A in its area which have reported the frame layout to sector with scheduling priority B.

At step 43C, the sector with scheduling priority C schedules frame N after considering the results of neighbor sectors with scheduling priority A and B in its area which have reported the frame layout to sector with scheduling priority C.

At step 44A, a sector with scheduling priorities A sends the frame layout it has computed to the sectors in its area with lower scheduling priorities B and C. The frame layout may be sent using signaling. It may comprise an identifier of the terminal scheduled on the different available resource or only an indication on the type of terminal scheduled. In general, the information describing the frame-layout for a future frame N contains for each resource in this frame-layout (e.g. for each slot in a WiMAX frame) the terminal number which occupies this frame resource.

To reduce the number of terminal numbers in the frame, the BS generating the frame layout, can combine terminals with similar one and path loss into a group and represent the group by one terminal number. This grouping of multiple terminals per allocation also gives more flexibility for data transmission when the calculated frame is transmitted later on.

To reduce signaling overhead, resources occupied by the same terminal number can be described in a compressed form, e.g. describe an area of resources in the frame which is occupied by the same terminal.

To reduce signaling overhead, the terminal number can simply be represented by the sounding position number in sector Ax if sounding is used to obtain channel specific information.

The frame-layout for a DL frame additionally shall contain the DL transmit power. If DL power control is performed then a DL transmit power value per terminal in the DL frame layout has to be provided, otherwise a DL transmit power value per BS has to be provided.

At step 44B, sectors with scheduling priorities B send the frame layout it has computed to the sectors in its area with lower scheduling priority C.

At step 45A, a sector with scheduling priority A inserts data into the frame layout which will be transmitted in the next frame.

At step 45B, a sector with scheduling priority B inserts data into the frame layout which will be transmitted in the next frame.

At step 46A, a sector with scheduling priority A transmits the current frame.

At step 46B, a sector with scheduling priority B transmit the current frame.

At step 46C, a sector with scheduling priority C transmit the current frame.

Figures 5, 6:
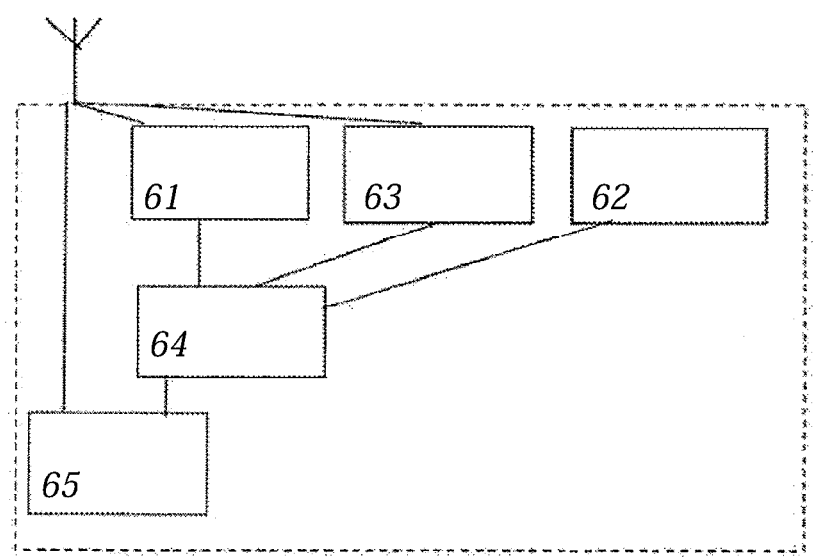
FIG. 5 shows a possible implementation of the gathering of channel specific information according to the present invention.
FIG. 6 shows a base station according to the present invention.

FIG. 5 show a possible implementation of the gathering of channel specific information according to the present invention. To find out which terminals could interfere, coordinated sounding can be used to get the channel information between the BS and the terminals in the serving sector and to get the channel information between the BS and the terminals in all the neighbor sectors. Channel information e.g. means the direction and the receive power when a BS receives a signal from a terminal, whereby the signal can be data originally addressed to the BS or can be interference when the BS receives an undesired signal which is originally addressed to an other BS.

In the following the description is made in the context of a WiMAX radio communication network. This will become visible especially through the way channel specific information is obtained by coordinated sounding. To perform coordinated sounding, an area of 7 sectors forms a coordinated sounding sector group, in which only one sector is sounding during one frame, i.e. only terminals in one sector are transmitting sounding signals. The BS in the sounding sector and the BSs in all the neighbor sectors belonging to the sounding group are receiving the sounding signals and generate channel information tables TBS. Then each BS transmits its channel information table to all its neighbor sectors. It will be understood by those skilled in the art that the tables can be also partly transmitted, if only a part of the table comprises relevant information for a neighboring base station. As well, the format for transmitting the table may be selected among a large number of options.

In the coordinated scheduling phase, the channel information tables are used by the base stations so that each of them generates a frame layout for the sectors they are responsible for by placing bursts for terminals which could interfere with terminals in neighbor sectors into different frame resources than those neighbors, i.e. referring back to FIG. 1 by allocating the downlink burst of Ty2 to a different location of the two-dimensional frame of BS2, than the resource Tx1 in a neighbor sector already occupies in the two-dimensional frame of BS1. Two-dimensional frames mean that they have both a time and a frequency extension. This is especially for OFDM/OFDMA frames as used on 3G LTE or WIMAX radio communication systems. The invention is nevertheless not restricted to the use in two-dimensional frame structure.

During initialization or by self organization methods, each sector receives parameters which together with the actual frame number allow the sector to determine its actual sounding status (active sounding or listening to neighbor sectors) and its actual scheduling priority A, B or C). During initialization or by self organization methods each sector will be assigned a fixed sounding ID [S0, S1, . . . S6]. With the sounding ID and the frame number every sector can determine the active sounding frame number, i.e. the frame number when this sector is allowed to sound its terminals.

In a coordinated sounding sector group (CSSG), the sounding signals are orthogonal, e.g. only one CSSG member is sounding during one frame. Each member of the CSSG gets a unique sounding ID [S0, S1, . . . S6]. As shown in FIG. 5, sectors with Sounding ID S2 perform sounding during frames 2, 9, 16 . . . . Sectors with Sounding ID S4 perform sounding during frames 4, 11, 18 . . . .

During sounding, channel information is obtained between
- all the terminals in the sounding sector X and the BS in the sounding sector X (stored in $TBS_{X,X}$).
- all the terminals in the sounding sector X and the BSs in all the neighbor sectors Y (stored in $TBS_{Y,X}$).

Preferably, the channel information is stored in the sounding tables $TBS_{Y,X}$, where X is the sounding sector and Y is the sector where sounding signals are received.

Preferably, each sector X stores and also reports the tables $TBS_{X,X}$ and $TBS_{X,Y}$ to all its neighbor sectors Y in its corresponding area.

For example, the tables $TBS_{X,X}$ contain the following measurement values for each terminal (represented by the sounding allocation) in sector X:
- txpwr uplink transmit power of terminal
- rxpwr: signal power received at BS
- angle: direction of the receiving signal as seen from the BS For example the tables $TBS_{Y,X}$ contain the following measurement values for each terminal (represented by the sounding allocation) in sector X:
- rxpwr: signal power received at BS
- angle: direction of the receiving signal as seen from the BS Scheduling in Sectors with Scheduling Priority A:

As sectors with scheduling priority A are the first ones which generate a frame layout for a future frame N, in principle each sector can generate an individual uplink frame layout taking into account only the traffic parameters (e.g. periodicity, bit rate, priority, . . . ) for all the established connections in sectors with scheduling priority A to predict the required amount of frame resources in future frame N.

To simplify the frame layout calculations of succeeding sectors with scheduling priority B, C, it is recommended but not mandatory that each sectors with scheduling priority A schedules according to angular sorting mechanism, i.e. it sorts the terminals in the sector by the angle (according table $TBS_{Ax,Ax}$) and schedules the terminals in the order indicated by the terminal numbers.

When a sectors with scheduling priority A finishes the calculations for frame layout n, it transmits the frame layout N to all of its neighbors sectors with scheduling priority B and C.

Scheduling in Sectors with Scheduling Priority B

Before calculating the frame layout for a future frame N, a sector with scheduling priority B has to calculate a preference matrix for each of its terminals (represented by terminal number y (terminal y)) which requires resources in the future frame N. Each matrix element represents the minimum SIR value for a frame resource when terminal y would be placed into that frame resource.

To calculate the preference matrix, sector By requires
- the frame layouts for frame N from all neighbor sectors with scheduling priority A.
- the sounding tables generated in sector By: $TBS_{By,By}$ and $TBS_{By,Ax}$ (e.g. in FIG. 2: $TBS_{By,By}$, $TBS_{By,A0}$, $TBS_{By,A1}$, $TBS_{By,A2}$)
- the sounding tables transmitted by the surrounding sectors Ax to sector By: $TBS_{Ax,Ax}$ and $TBS_{Ax,By}$
- traffic parameters (e.g. periodicity, bit rate, priority, . . . ) for all the established connections in sectors with scheduling priority B to predict the required amount of frame resources in future frame N Preference matrix for a sector with scheduling priority B surrounded by sectors with scheduling priority A may be calculated as follows:

$$PrefBy(\text{resource,terminal } y) = \text{Min}(SIR_{By,Ax}, SIR_{Ax,By})$$

In case of a sector structure as in FIG. 2, a preference matrix calculated for a sector with scheduling priority B may be:

$$PrefBy(\text{resource,terminal } y) = \text{Min}(SIR_{By,A0}, SIR_{By,A1},$$
$$SIR_{By,A2}, SIR_{A0By}, SIR_{A1By}, SIR_{A2By})$$

$SIR_{By,A0}$, is the interference which terminal y in By suffers from terminal x in sector A0 if terminal y occupies this resource.

$SIR_{By,A1}$ is the interference which terminal y in By suffers from terminal x in sector A1 if terminal y occupies this resource.

$SIR_{By,A2}$ is the interference which terminal y in By suffers from terminal x in sector A2 if terminal y occupies this resource.

$SIR_{A0By}$ is the interference which terminal x in A0 suffers from terminal y in sector By if terminal y occupies this resource.

$SIR_{A1By}$, is the interference which terminal x in A1 suffers from terminal y in sector By if terminal y occupies this resource.

$SIR_{A2By}$, is the interference which terminal x in A2 suffers from terminal y in sector By if terminal y occupies this resource.

Terminal y in a sector with scheduling priority B can use the same frame resource, which already is in use in one or several sectors with scheduling priority A, if PrefBy(resource, terminal y) is bigger than predefined value $SIR_{min}$, otherwise terminal y in sectors with scheduling priority B should avoid this frame resource.

Instead of the SIR, any other quantity reflective of an interference situation degrading the quality of the transmitted data my be used for the purpose of the scheduling. Such quantities may be CQI (channel quality indicator), uplink/downlink pathloss, Precoding Matrix Index (PMI) for best and worst transmission conditions, . . . .

When a sector with scheduling priority B finishes the calculations for frame layout N, it transmits the frame layout N to all of its neighbor sectors with scheduling priority C.

Scheduling in Sectors with Scheduling Priority C:

Before calculating the frame layout for a future frame N, a sector with scheduling priority C has to calculate a preference matrix for each of its terminals (represented by terminal number z (terminal z)) which requires resources in the future frame N. Each matrix element represents the minimum SIR value for a frame resource when terminal z would be placed into that frame resource.

To calculate the preference matrix, a sector with scheduling priority C requires
- the frame layouts for frame N from all neighbor sectors with scheduling priority A and B.
- the sounding tables generated in sectors with scheduling priority C: $TBS_{Cz,Cz}$, $TBS_{Cz,Ax}$, $TBS_{Cz,By}$ (e.g. in FIG. 2: $TBS_{Cz,Cz}$, $TBS_{Cz,A0}$, $TBS_{Cz,A1}$, $TBS_{Cz,A2}$, $TBS_{Cz,B0}$, $TBS_{Cz,B1}$, $TBS_{Cz,B2}$)
- the sounding tables transmitted by the surrounding sectors with scheduling priority A and B to sector with scheduling priority C: $TBS_{Ax,Ax}$, $TBS_{By,By}$, $TBS_{Ax,Cz}$, $TBS_{By,Cz}$ (e.g. in FIG. 2: $TBS_{A0,A0}$, $TBS_{A1,A1}$, $TBS_{A2,A2}$, $TBS_{B0,B0}$, $TBS_{B1,B1}$, $TBS_{B2,B2}$, $TBS_{A0,Cz}$, $TBS_{A1,Cz}$, $TBS_{A2,Cz}$, $TBS_{B0,Cz}$, $TBS_{B1,Cz}$, $TBS_{B2,Cz}$)
- traffic parameters (e.g. periodicity, bit rate, priority, . . . ) for all the established connections in sector with scheduling priority C to predict the required amount of frame resources in future frame N Preference matrix calculated by a sector with scheduling priori may be:

$$PrefC(\text{resource},\text{terminal } z)=\text{Min}(SIR_{CzAx},SIR_{CzBy},SIR_{AxCz},SIR_{ByCz})$$

Example for a preference matrix calculated by a sector with scheduling priority C, surrounded by sectors with scheduling priority A and B:

$$PrefCz(\text{resource},\text{terminal } z)=\text{Min}(SIR_{CzA0},SIR_{CzA1},SIR_{CzA2},SIR_{CzB0},SIR_{CzB1},SIR_{CzB2},SIR_{A0Cz},SIR_{A1Cz},SIR_{A2Cz},SIR_{B0Cz},SIR_{Bc1Cz},SIR_{B2Cz})$$

Terminal z in sectors with scheduling priority C can use the same frame resource, which already is in use in one or several sectors with scheduling priority A or B if PrefCz (resource, terminal z) is bigger than a predefined value $SIR_{min}$, otherwise terminal z in sector with scheduling priority C should avoid this frame resource.

So far the channel specific information evaluated in the uplink have been used to deduce channel specific information in the downlink. This is a valid assumption in a TDD (Time Division Duplex system) when uplink and downlink transmission occur on the same frequencies.

In a FDD (frequency time duplex) system, this is not the case. In order to get reliable channel specific information for the appropriate transmission direction, the calculation of the DL path loss can not be performed using UL sounding signals, but has to be performed using DL measurements, i.e. additional measurements are required.

For example, to calculate the DL path loss in the serving sector, each terminal in the serving sector (e.g. Ax) measures the received power of the DL preamble which is transmitted by the BS in the serving sector. These measurement than can be stored per terminal e.g. in $TBS_{Ax,Ax}$. Other methods may also be used for this purpose. For example reserve a small frame resource in the DL frame. Like in the case of coordinated sounding, only the BS in one sector of the coordinated sounding sector group (e.g. sector S1 in FIG. 1) transmits a DL burst in this frame resource. All the terminals in the sector S0 and all the surrounding sectors receive the DL burst, measure the receive signal power and transmit it to its serving BS which stores it in tables. Then the sectors exchange the tables like in the TDD case.

After all sectors have generated a frame layout for frame N, latest in frame N−1 each sector has to schedule data into frame N according to its pre-calculated frame layout for frame N and the current traffic requirements. In case of DL scheduling, data, which is present in the BS at that moment has to be scheduled into the DL frame.

In case of UL scheduling, UL grants have to be generated for data which is waiting in the terminals.

FIG. 6 shows a base station according to the present invention. The base station is adapted to be used in a radio communication network as WIMAX or 3G LTE for example. The base station controls transmission and reception in a sector of the radio communication system. A described above the sector and be a 120° sector served with a directive antenna or antenna arrays able to apply beamforming. The base station comprises means 61 for determining an area in its neighborhood. Preferably, the area comprises all the sectors and their corresponding base stations surrounding the sector served by the base station under consideration. Further, the base station comprises means 62 for determining a scheduling priority for its corresponding sector. This scheduling priority preferable is modified dynamically. The base station also comprises means 63 for receiving and storing scheduling decisions from base stations belonging to the area under consideration. In addition, base station comprises means 64 for scheduling transmission in its sector, depending on transmissions scheduled for a sector belonging to said area with scheduling priority higher than its own scheduling priority and means 65 for reporting by said base station its scheduling decisions to a base station with lower scheduling priority than its own scheduling priority.

The invention claimed is:

1. A method for scheduling transmissions in a radio communication system comprising a plurality of base stations and a plurality of terminals, wherein a base station is associated with a sector and transmits and receives data to and from terminals located in the sector, the method comprising:
   determining an area around each given sector, the area comprising a set of sectors,
   allocating to the sectors in the area a scheduling priority chosen among at least two different scheduling priorities,
   scheduling decisions in a sector having a lower scheduling priority than a sector belonging to the area, based on scheduling decisions made in the sector with higher scheduling priority,
      wherein the base station associated with the sector having higher scheduling priority reports scheduling decisions to another base station associated with the sector having lower scheduling priority,
      wherein the scheduling priority of each sector varies from frame to frame, and
      wherein sector scheduling is based on intra- and inter-sector base station-to-terminal channel specific information and the exchange of such channel specific information between neighboring base stations.

2. A method according to claim 1, wherein, the priority allocated to the sectors in the area is modified dynamically.

3. A method according to claim 1, wherein each base station comprises base station or terminal channel-specific information related to the channel conditions between the base station and terminals requiring scheduling located in the area associated with the sector the base station is serving.

4. A method according to claim 3, wherein the base station or terminal channel-specific information regarding terminals requiring scheduling located in the area is exchanged between base stations corresponding to sectors belonging to the area, the scheduling further depending on the exchanged base station or terminal channel-specific information.

5. A method according to claim 1, wherein the scheduling is performed sequentially by base stations with increasing scheduling priority, wherein scheduling at a base station with lower scheduling priority occurs upon receipt of scheduling decisions by base stations with higher scheduling priority.

6. A method according to claim 1, wherein the base station comprises information related to the sequence of scheduling priority allocations to each of its sectors.

7. A method according to claim 1, wherein the scheduling further depends on an estimation of the interference which a terminal belonging to a sector with lower scheduling priority would generate if it were scheduled on the same resource as a terminal already scheduled in a sector with higher scheduling priority, wherein a terminal in a sector with lower scheduling priority is scheduled such that the estimation of the interference it would generate is below a predefined threshold.

8. A base station operative to be used in a radio communication system comprising a plurality of base stations and a plurality of terminals, wherein the base station is associated with a sector and transmits and receives data to and from terminals located in the sector, the base station comprises:

at least one processor configured to determine an area around each of its sectors comprising a set of sectors, at least one processor configured to determine for the sector a scheduling priority chosen among at least two different scheduling priorities, at least one receiver configured to receive and to store scheduling decisions of a sector belonging to the area, at least one processor configured to schedule transmission in its sector, depending on transmissions scheduled for a sector belonging to the area with scheduling priority higher than its own scheduling priority, wherein the scheduling priority for each sector varies from frame to frame, and wherein sector scheduling is based on intra- and inter-sector base station-to-terminal channel specific information and the exchange of such channel specific information between neighboring base stations, and at least one transmitter configured to report by the base station its scheduling decisions to a base station with lower scheduling priority than its own scheduling priority.

* * * * *